No. 797,091. PATENTED AUG. 15, 1905.
M. H. WILSON.
SPRING SCALE.
APPLICATION FILED AUG. 17, 1903.
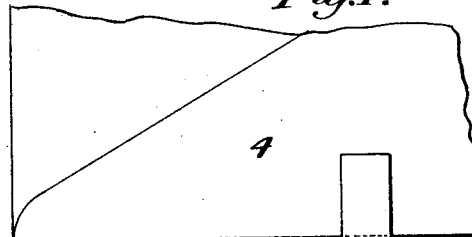
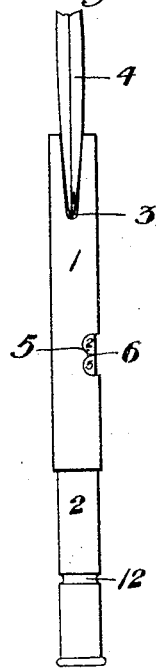
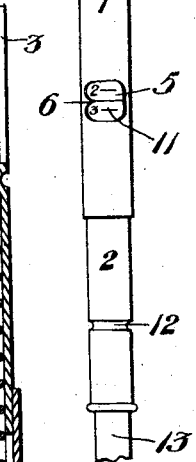
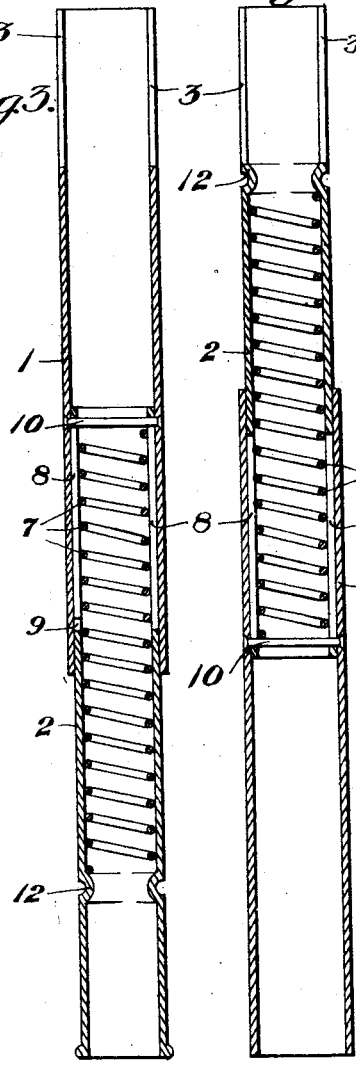
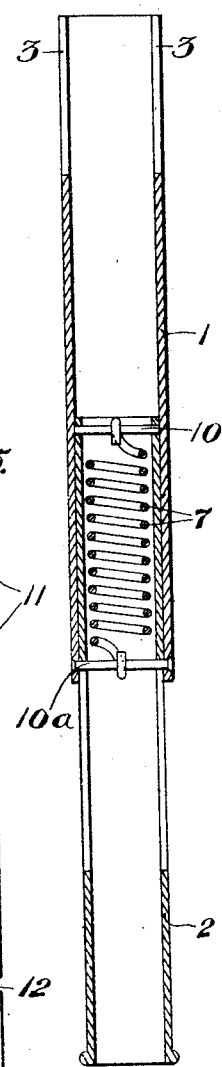
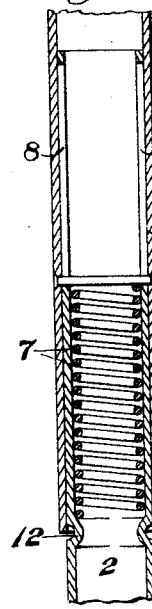
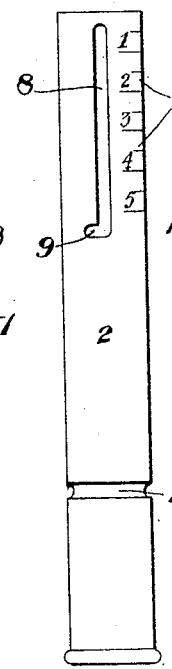
Witnesses:
Inventor:

UNITED STATES PATENT OFFICE.

MICHAEL H. WILSON, OF PITTSBURG, PENNSYLVANIA.

SPRING-SCALE.

No. 797,091. Specification of Letters Patent. Patented Aug. 15, 1905.

Application filed August 17, 1903. Serial No. 169,791.

*To all whom it may concern:*

Be it known that I, MICHAEL H. WILSON, a citizen of the United States, residing at Pittsburg, in the county of Allegheny and State of Pennsylvania, have invented new and useful Improvements in Spring-Scales, of which the following is a specification.

My invention relates to spring-scales, and more particularly to a new and improved spring-scale adapted to be employed in weighing letters and parcels and to be used in connection with a lead-pencil or similar article.

To this end the present invention consists of a new and improved spring-scale and in the construction and combination of parts, all as fully hereinafter described and claimed.

In the accompanying drawings, which illustrate applications of my invention, Figure 1 is a front elevational view of my invention, showing a portion of an envelop and the scale carried on a pencil; Fig. 2, a side elevation; Fig. 3, an enlarged vertical sectional view; Fig. 4, a broken vertical sectional view of the form of Fig. 3, showing the spring contracted; Fig. 5, an elevational view of one of the tubes; Fig. 6, a central vertical sectional view of a modified form, and Fig. 7 a similar view showing a different form of spring.

Referring to the drawings, the scale comprises two telescopic tubes 1 and 2. The outer tube 1, as illustrated, is provided at one end with a V-shaped slot 3, into which the article 4 is placed when being weighed. The outer tube is further provided with an opening 5 and a pointer 6.

The inner tube, within which a spring 7 is located, has two diametrically-opposed vertical slots 8, both of which terminate in a set-off or short opening 9 at right angles with the said slot or slots.

The outer tube 1 carries a pin or cross-piece 10, which is adapted to travel in the slots 8 and be turned into the openings 9 for the purpose of maintaining the outer tube in the desired position when the scale is not being used, as particularly shown by Fig. 4.

In the forms of my invention as shown a graduated scale 11 is marked on the inner tube, and in the act of weighing an article the pointer 6 travels over said graduated scale, which latter may be clearly seen through opening 5 in the outer tube.

Spring 7 is preferably loose within the inner tube, one end being in contact with the pin 10 and its other end bearing against the rib 12, formed in the inner tube.

In the form of Fig. 6 the inner tube 2 is provided with the means for holding the article to be weighed and is adapted to move up and down. In this form the outer tube and its pointer remain stationary, and the inner tube, provided with the graduated scale, moves in the act of weighing the article.

In the form of Fig. 7 I have shown a slightly-modified construction, in which I employ an extension-spring or a spring that is extended during the operation of weighing instead of being contracted, as in the other forms illustrated. In this instance I employ an extension-spring having its ends attached to cross-pins 10 and $10^a$.

What I claim is—

1. In a spring-scale, the combination, with two telescopic tubes, a pointer on the outer tube, a spring within the inner tube, said inner tube provided with vertical slots each terminating in a set-off, a graduated scale on the inner tube, a cross-piece carried on the outer tube and adapted to travel in said slots, and an opening in the outer tube to permit the graduated scale to be seen, substantially as set forth.

2. In a spring-scale, the combination, with two telescopic tubes, a pointer on the outer tube, a loose spring within the inner tube, said inner tube provided with vertical slots each terminating in a set-off at right angles with the slots, a graduated scale on the inner tube, a cross-piece carried on the outer tube and adapted to travel in said slots, a rib formed in the inner tube, the ends of the said spring in contact with the rib and cross-piece, and an opening in the outer tube to permit the graduated scale to be seen, substantially as set forth.

3. In a spring-scale, the combination, with two telescopic tubes, a spring within the inner tube, said inner tube provided with vertical slots each terminating in a set-off, a graduated scale, and a cross-piece carried on the outer tube and adapted to travel in said slots, substantially as set forth.

In testimony whereof I have signed my name to this specification in the presence of two subscribing witnesses.

MICHAEL H. WILSON.

Witnesses:
 MARGARET HUGHES,
 W. G. DOOLITTLE.